M. WILHELMS.
Cigar-Makers' Paste-Box.
No. 167,376. Patented Aug. 31, 1875.
Fig: 1
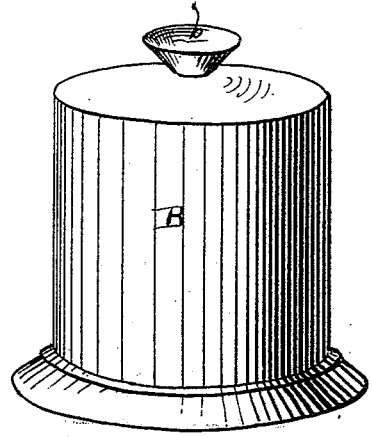
Fig: 2.
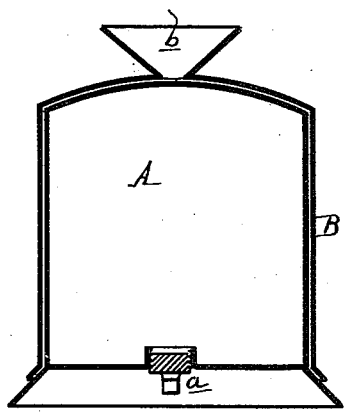

UNITED STATES PATENT OFFICE.

MICHAEL WILHELMS, OF CHICAGO, ILLINOIS.

IMPROVEMENT IN CIGAR-MAKERS' PASTE-BOXES.

Specification forming part of Letters Patent No. 167,376, dated August 31, 1875; application filed July 22, 1875.

*To all whom it may concern:*

Be it known that I, MICHAEL WILHELMS, of Chicago, in the county of Cook and State of Illinois, have invented an Improvement in a Cigar-Maker's Paste-Box, of which the following is a specification:

My invention has for its object to so construct a paste-box for cigar-makers' use as that it will preserve the paste fresh for a longer period than an open cup, by excluding it from the atmosphere, except a small portion in a finger-cup, which is filled from time to time, as required, and also to prevent it from souring in hot weather by keeping it cool in contact with a vessel below it containing cold water.

Figure 1 is a perspective view. Fig. 2 is a vertical section.

In the drawing, A represents a sheet-metal vessel, closed at both ends, and provided with a screw-plug, $a$, in the bottom, by removing which it may be filled with cold water. B is the cup, closed at the top, open at the bottom, and sleeved on the vessel A, to which it is snugly fitted. At the top there is a small hopper-shaped finger-cup, $b$, with an opening in the bottom communicating with the interior of the cup.

To fill the cup, invert it, fill in the paste until partly full, insert the vessel A, and then set the whole down, resting the base of the vessel upon the table or work-bench. When paste is required, press down the cup, which will then force a portion of its contents up into the finger-cup. The small quantity at a time in the latter prevents its deterioration under atmospheric influences, and fouling by dust before it is used, while the water in the vessel will keep the main portion cool.

What I claim as my invention is—

The vessel A, fitted with the base-plug $a$, and the cup B, provided with the finger-cup $b$, constructed and combined in the manner and for the purpose set forth.

MICHAEL WILHELMS.

Witnesses:
WM. H. LOTZ,
GEO. FROMMANN.